(12) United States Patent
Wu et al.

(10) Patent No.: US 8,780,956 B2
(45) Date of Patent: Jul. 15, 2014

(54) METHOD AND DEVICE FOR DETERMINING SMOOTH WINDOW LENGTH IN CHANNEL ESTIMATION

(75) Inventors: Gengshi Wu, Shanghai (CN); Fengyu Sun, Shanghai (CN); Meng Hua, Shanghai (CN); Chunling Zhang, Shanghai (CN); Shurong Jiao, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 545 days.

(21) Appl. No.: 13/191,151

(22) Filed: Jul. 26, 2011

(65) Prior Publication Data

US 2012/0020440 A1    Jan. 26, 2012

(30) Foreign Application Priority Data

Jul. 26, 2010    (CN) .......................... 2010 1 0239269

(51) Int. Cl.
*H04B 1/7073* (2011.01)
*H04L 25/02* (2006.01)

(52) U.S. Cl.
CPC ................................. *H04L 25/0228* (2013.01)
USPC ........................................................ 375/145

(58) Field of Classification Search
CPC ....................................................... H04B 1/707
USPC ......................................... 375/142, 145, 150
See application file for complete search history.

(56) References Cited

U.S. PATENT DOCUMENTS

2004/0135725 A1 * 7/2004 Akita ............................ 342/457

2008/0056390 A1   3/2008 Rainbolt et al.
2008/0101306 A1 * 5/2008 Bertrand et al. .............. 370/336

FOREIGN PATENT DOCUMENTS

CN          101741487 A       6/2010
WO       WO 02/078213 A1      10/2002

OTHER PUBLICATIONS

1st Office Action in corresponding Chinese Patent Application No. 201010239269.7 (Jun. 19, 2012).
Asyhari et al., *Adaptive Window Length Estimation for Channel Estimation in CDMA Receivers*, 18th Annual IEEE PIMRC, Sep. 3-7, 2007, Athens.
European Search Report in corresponding European Patent Application No. 11 17 5203 (Oct. 11, 2011).
Extended European Search Report in corresponding European Patent Application No. 13171379.4 (Jul. 1, 2013).

* cited by examiner

*Primary Examiner* — Kevin Kim
(74) *Attorney, Agent, or Firm* — Leydig, Voit & Mayer, Ltd.

(57) ABSTRACT

A method and a device for determining a smooth window length in channel estimation is provided. The method includes: obtaining autocorrelation values of pilot signals, where the autocorrelation values include first autocorrelation values and second autocorrelation values, at least two first autocorrelation values exist, and at least one second autocorrelation value exists; determining a speed range according to symbols of the first autocorrelation values or the symbols of the first autocorrelation values and a ratio value between the second autocorrelation value and one of the first autocorrelation values; and determining the smooth window length according to the speed range. Through the method provided in embodiments of the present invention, the problems caused by a fixed smooth window length may be avoided, and this improves system performance.

10 Claims, 2 Drawing Sheets

METHOD AND DEVICE FOR DETERMINING SMOOTH WINDOW LENGTH IN CHANNEL ESTIMATION

CROSS-REFERENCE TO RELATED APPLICATIONS

This application claims priority to Chinese Patent Application No. 201010239269.7, filed on Jul. 26, 2010, which is hereby incorporated by reference in its entirety.

FIELD OF THE INVENTION

The present invention relates to the field of mobile communications technologies, and in particular, to a method and a device for determining a smooth window length in channel estimation.

BACKGROUND OF THE INVENTION

A Wideband Code Division Multiple Access (Wideband Code Division Multiple Access, WCDMA) system adopts a Common Pilot Channel (Common Pilot Channel, CPICH) signal to perform channel estimation. During the channel estimation, a smoothing process is generally required to eliminate the influence of interferences such as noises. The principle of determining a smooth window length is that the smooth window length is as long as possible while ensuring correlation between signals within the window. If the smooth window length is too small, the correlation between signals cannot be fully utilized, so that a good noise suppression effect is unable to be achieved. If the smooth window length is too large, the smoothing operation is performed on signals with low correlation, so that the accuracy of channel estimation is decreased and throughput performance is directly affected. Therefore, proper selection of the smooth window length according to the signal correlation is one of the efficient ways to increase the accuracy of the channel estimation and improve system performance.

In wireless communications, the signal correlation may be measured by a coherence time, which is a statistical average value of time intervals in which a channel impulse response remains the same, and is approximately the reciprocal of a Doppler frequency shift. The Doppler frequency shift is mainly caused by a relative speed between a user device and a base station. The smooth window lengths in optimal channel estimation corresponding to different speeds are different.

In the prior art, a fixed smooth window length is adopted during determination of the smooth window length, which may cause that the suppression performance gain cannot be obtained at a low speed and that the data having relatively low correlation may be introduced at a high speed, thereby causing the performance degradation.

SUMMARY OF THE INVENTION

Embodiments of the present invention provide a method and a device for determining a smooth window length in channel estimation, so as to solve the problem caused by a fixed smooth window length in the prior art.

An embodiment of the present invention provides a method for determining a smooth window length in channel estimation, where the method includes:

obtaining autocorrelation values of pilot signals, where the autocorrelation values include first autocorrelation values and second autocorrelation values, at least two first autocorrelation values exist, and at least one second autocorrelation value exists; and determining a speed range according to symbols of the first autocorrelation values or the symbols of the first autocorrelation values and a ratio value between the second autocorrelation value and one of the first autocorrelation values, and determining the smooth window length according to the speed range.

Another embodiment of the present invention provides a device for determining a smooth window length in channel estimation, where the device includes:

an obtaining module, configured to obtain autocorrelation values of pilot signals, where the autocorrelation values include first autocorrelation values and second autocorrelation values, at least two first autocorrelation values exist, and at least one second autocorrelation value exists; and a determining module, configured to determine a speed range according to symbols of the first autocorrelation values or the symbols of the first autocorrelation values and a ratio value between the second autocorrelation value and one of the first autocorrelation values, and determine the smooth window length according to the speed range.

It can be seen from the technical solutions of the present invention that, through the method and the device for determining the smooth window length in the channel estimation according to the present invention, an autocorrelation function is obtained, the speed range is determined according to the autocorrelation function, and the smooth window length is determined according to the speed range, so that different smooth window lengths may be determined according to different speeds, thereby avoiding the problems caused by the fixed smooth window length.

BRIEF DESCRIPTION OF THE DRAWINGS

To illustrate the technical solutions according to the embodiments of the present invention more clearly, the accompanying drawings required for describing the embodiments are introduced briefly in the following. Apparently, the accompanying drawings in the following description are only some embodiments of the present invention; persons of ordinary skill in the art may also derive other drawings according to the accompanying drawings without any creative effort.

DETAILED DESCRIPTION OF THE EMBODIMENTS

In order to make the objectives, technical solutions, and advantages of the embodiments of the present invention clearer, the technical solutions of the embodiments of the present invention are completely and clearly described in the following with reference to the accompanying drawings. Apparently, the embodiments in the following descriptions are merely a part of the embodiments of the present invention, rather than all the embodiments of the present invention. Persons of ordinary skill in the art can derive other embodiments based on the embodiments of the present invention without creative efforts, which all fall within the scope of the present invention.

Figure 1:
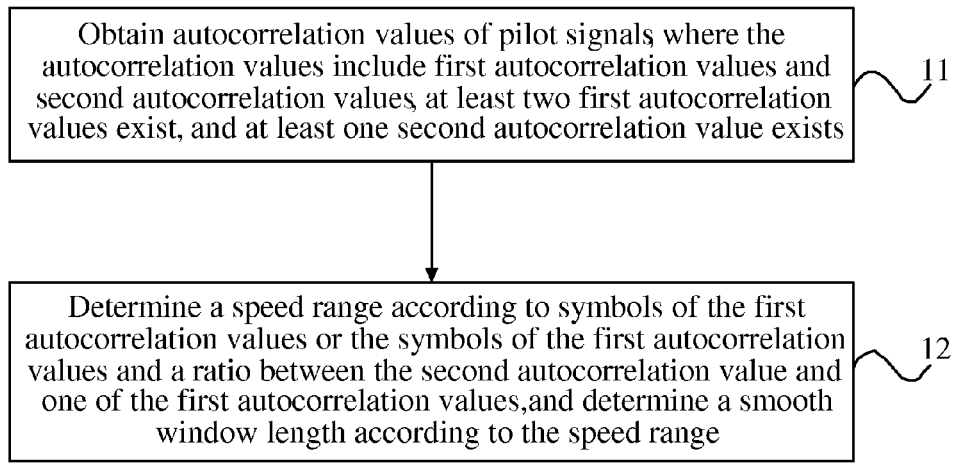
FIG. 1 is a schematic flow chart of a method according to a first embodiment of the present invention.

FIG. 1 is a schematic flow chart of a method according to a first embodiment of the present invention. The method includes the following steps.

In step 11, autocorrelation values of pilot signals are obtained, where the autocorrelation values include first autocorrelation values and second autocorrelation values, at least two first autocorrelation values exist, and at least one second autocorrelation value exists.

The pilot signal may be a CPICH signal. As most communication channels conform to the Rayleigh channel model. A signal autocorrelation function of the Rayleigh channel presents the characteristic of a zero-order Bessel function. The zero-order Bessel function is related to the Doppler frequency shift, and the Doppler frequency shift is related to a relative speed between a mobile device and a transmitting station. Therefore, in this embodiment of the present invention, speed estimation may be performed according to an autocorrelation function of the CPICH signal, so that different smooth window lengths are determined according to different speeds. Moreover, the embodiment of the present invention is also applicable to the Rician channel.

Since WCDMA supports dual-antenna transmission, an antenna separation value of the CPICH signal may be used to represent the CPICH signal at a receiving end.

It is assumed that a time slot index is t, a path index is j, and an antenna separation value index is i, so in the time slot t, an antenna separation value of the ith pilot signal in the jth path is $A_{i,j}(t)$.

It is assumed that the number of effective paths within a multi-path search period of an index f is $N_f$ and the number of pilot signal symbols corresponding to each antenna is N, so an accumulated value of the antenna separation values of the pilot signals within each time slot is as follows:

$$A_j(t) = \sum_{i=1}^{N/2} A_{i,j}(t), \; j = 1, \ldots, N_f \text{ and } t = 0, \ldots, 14$$

Taking N=10 as an example, the accumulated value is $$A_j(t) = \sum_{i=1}^{5} A_{i,j}(t),$$

where $j=1, \ldots, N_f$.

It is assumed that the number of pilot channel time slots contained in the multi-path search period of the index f is $L_{mpsf}$, so an autocorrelation value of the antenna separation values of the pilot signals at a time slot level $R_f(k)$ is as follows:

$$R_f(k) = \sum_{t=1}^{L_{mpsf}} \sum_{j=1}^{N_f} \{\text{Re}[A_j(t-k) \times A_j^*(t)]\}$$

where f is the index of the multi-path search period.

It is assumed that the number of the multi-path search periods contained in a single speed estimation period is M, the autocorrelation value of the pilot signals within the single speed estimation period R(k) is as follows:

$$R(k) = \sum_{f=1}^{M} R_f(k)$$

where k is a correlation interval, and the value of M may be 100.

Moreover, in the embodiment of the present invention, the autocorrelation value may be an autocorrelation value in non-zero correlation intervals, which refers to an autocorrelation value obtained by using the foregoing calculation formula when k≠0. Since noise processing needs to be performed on autocorrelation values in the zero correlation interval, in this embodiment, a non-zero autocorrelation value is adopted, so that the noise processing does not need to be performed. Of course, if the autocorrelation values in the zero correlation interval are adopted as the autocorrelation values, the noise processing may be further performed, and then the principle of the embodiment of the present invention is adopted.

In step 12, a speed range is determined according to symbols of the first autocorrelation values or the symbols of the first autocorrelation values and a ratio value between the second autocorrelation value and one of the first autocorrelation values, and a smooth window length is determined according to the speed range.

An autocorrelation function may show a degree of correlation between two signals having a time interval. When the autocorrelation value is larger, the degree of correlation is higher, and the corresponding speed is lower. Therefore, the corresponding speed range may be determined according to the autocorrelation values. Since at different speeds the channels correspond to different optimal smooth window lengths, the smooth window length may be determined according to the speeds to obtain the optimal performance.

The applicable speed range may be expanded when the first autocorrelation value is adopted, and the accuracy of the applicable speed range may be increased in a certain speed range when the ratio value between the second autocorrelation value and the one of first autocorrelation values is adopted. In this embodiment, the autocorrelation function is obtained, the speed range is determined according to the autocorrelation function, and the smooth window length is determined according to the speed range, so that different smooth window lengths may be determined according to different speeds, thereby avoiding the problems caused by a fixed smooth window length. Moreover, in this embodiment, the speed range is determined according to the symbols of the autocorrelation values, so that an effective range of the speed estimation is expanded; after the approximate speed range is determined according to the symbols of the autocorrelation values, the speed range is determined according to the ratio value between autocorrelation values, so as to increase the accuracy of the speed estimation in a speed range with a higher accuracy demand.

Figure 2:
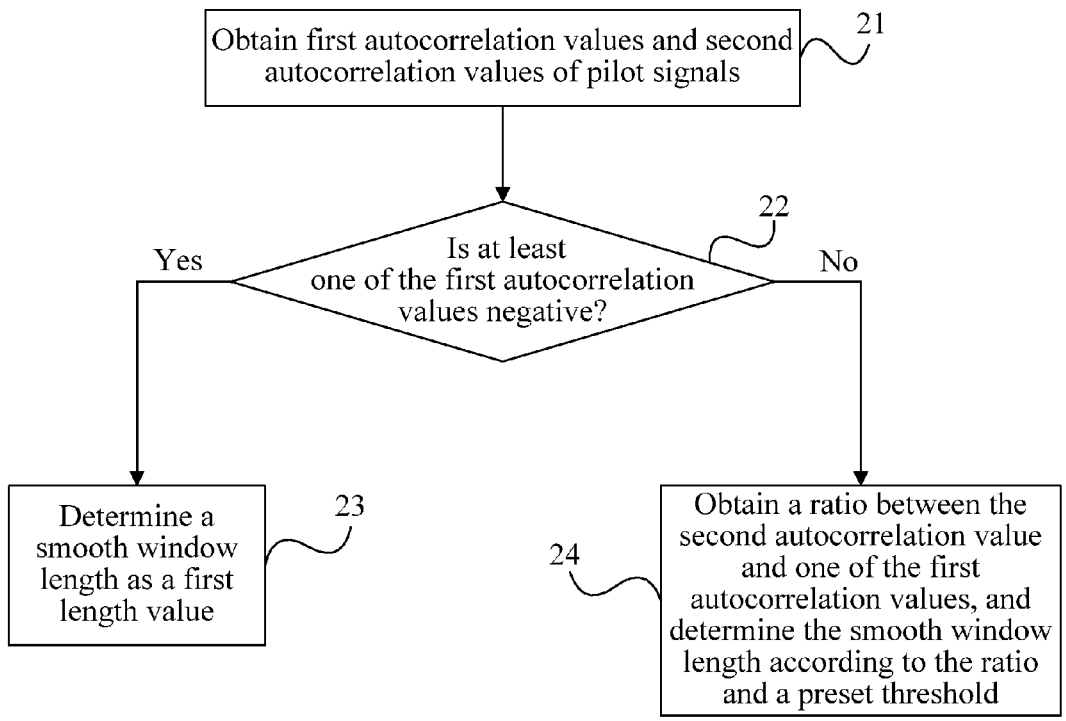
FIG. 2 is a schematic flow chart of a method according to a second embodiment of the present invention.

FIG. 2 is a schematic flow chart of a method according to a second embodiment of the present invention. The method includes the following steps.

In step 21, first autocorrelation values and second autocorrelation values of pilot signals are obtained, where two first autocorrelation values exist, and only one second autocorrelation value exists.

An autocorrelation value is R(k). For the calculation formula of R(k), reference may be made to the first embodiment.

In this embodiment, the first autocorrelation values may be represented as R(k1) and R(k2) respectively, and the second autocorrelation value is represented as R(k3).

The values of k1 and k2 are close to zero, for example, k1=1 and k2=2; and the value of k3 is far from zero, for example, k3=4.

In step 22, it is determined whether at least one of the first autocorrelation values is a negative value, and if yes, step 23 is performed; otherwise, step 24 is performed.

In step 23, a smooth window length is determined as a first length value.

Since at least one of R(k1) and R(k2) is a negative value, a first speed range is determined, where the first speed range is an extremely high speed range, for example, a speed is higher than 150 kilometers per hour (150 km/h) and generally lower than 800 km/h.

Since the speed is high under this circumstance, a smaller smooth window length needs to be adopted. For example, the first length value is determined as L=5. In this embodiment of the present invention, the unit of a smooth window is the number of antenna separation values $A_{i,j}(t)$ of pilot signals. For example, if L=5, it indicates that each smooth window contains five $A_{i,j}(t)$.

In step 24, a ratio value between the second autocorrelation value and one of the first autocorrelation values is obtained, and the smooth window length is determined according to the ratio value and a preset threshold.

Since both R(k1) and R(k2) are positive values, a second speed range may be determined, where the second speed range is lower than 150 km/h (or higher than 800 km/h). Since the speed higher than 800 km/h hardly occurs in a practical application scenario, the second speed range is lower than 150 km/h by default when both R(k1) and R(k2) are positive values. Of course, if a scenario that the speed range is higher than 800 km/h is considered, new autocorrelation values may be further introduced, and it is determined whether the speed range is lower than 150 km/h or higher than 800 km/h according to the new autocorrelation values. Here, 150 km/h is taken as an example. Under this circumstance, in order to increase the accuracy, this range needs to be further divided.

For example, a first threshold Threshold_1 and a second threshold Threshold_2 are set (Threshold_1>Threshold_2), the specific values of which may be determined according to a practical situation, for example, 0.97 and 0.55 respectively.

$$\frac{R(k3)}{R(k1)}$$

is taken as an example for the ratio value between the second autocorrelation value and one of the first autocorrelation values.

If $$\frac{R(k3)}{R(k1)} \geq \text{Threshold\_1},$$

a low speed channel is determined. Under this circumstance, a larger smooth window length needs to be adopted. For example, the smooth window length is determined as a second length value, which may be 15. If $$\text{Threshold\_2} \leq \frac{R(k3)}{R(k1)} < \text{Threshold\_1},$$

a medium speed channel is determined. Under this circumstance, a medium smooth window length needs to be adopted. For example, the smooth window length is determined as a third length value, which may be 10.

If $$\frac{R(k3)}{R(k1)} < \text{Threshold\_2},$$

a high speed channel is determined. Under this circumstance, a smaller smooth window length needs to be adopted. For example, the smooth window length is determined as a fourth length value, which may be 5.

It can be understood that, when calculating $$\frac{R(k3)}{R(k1)},$$

α filtering may also be performed on the ratio value, and then the comparison with the threshold is performed.

It can be understood that, in order to further improve the system performance, more autocorrelation values in different interval positions and/or more thresholds may be introduced. The time interval and/or threshold may be specifically determined according to practical requirements.

Furthermore, for different types of channels, standards corresponding to all the types of channels may be unified by using an interference elimination technology. For example, the interference elimination technology is adopted so that all the types of channels correspond to approximately unified thresholds.

In this embodiment, symbols of the first autocorrelation values are first compared to divide a wide speed range. When the speed range is an extremely high speed range, it may be directly determined that a small smooth window length is adopted. When the first autocorrelation values are both positive values, speed division may be further performed to increase the accuracy. In this embodiment, through the two-step method, an effective range of speed estimation may be expanded, so as to ensure that higher accuracy of speed estimation is obtained within a lower speed range, which satisfies system requirements, so as to further increase the accuracy of the channel estimation and improve the system performance.

Figure 3:
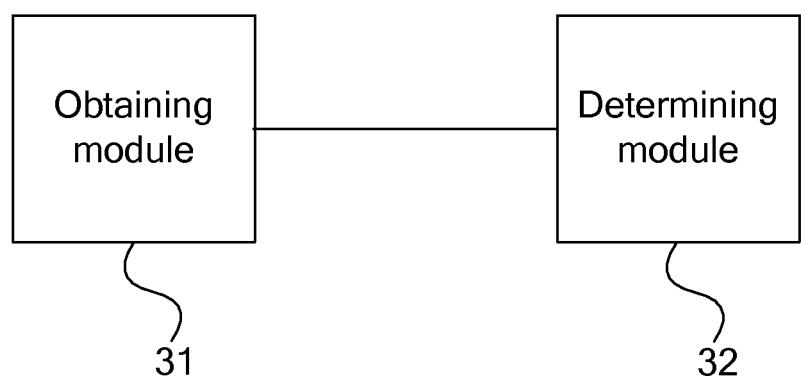
FIG. 3 is a schematic diagram showing a structure of a device according to a third embodiment of the present invention.

FIG. 3 is a schematic diagram showing a structure of a device according to a third embodiment of the present invention. The device includes an obtaining module 31 and a determining module 32. The obtaining module 31 is configured to obtain autocorrelation values of pilot signals, where the autocorrelation values include first autocorrelation values and second autocorrelation values, at least two first autocorrelation values exist, and at least one second autocorrelation value exists. The determining module 32 is configured to determine a speed range according to symbols of the first autocorrelation values or the symbols of the first autocorrelation values and a ratio value between the second autocorrelation value and one of the first autocorrelation values and determine a smooth window length according to the speed range.

The autocorrelation values of the pilot signals are autocorrelation values in non-zero correlation intervals. The autocorrelation value of the pilot signal is as follows:

$$R(k) = \sum_{f=1}^{M} R_f(k)$$

where R(k) is the autocorrelation value of the pilot signals, k is a correlation interval and not equal to 0, M is the preset number of multi-path search periods, $R_f(k)$ is an autocorrelation value of a pilot signal within a multi-path search period of an index f, and a calculation formula of $R_f(k)$ is as follows:

$$R_f(k) = \sum_{t=1}^{L_{mpsf}} \sum_{j=1}^{N_f} \{\text{Re}[A_j(t-k) \times A_j^*(t)]\}$$

where $L_{mpsf}$ is the number of pilot channel time slots contained in the multi-path search period of the index f, $N_f$ is the number of effective paths in the multi-path search period of the index f, Re( ) is an operation for taking a real part, $A_j^*(t)$ is a conjugate function of $A_j(t)$, $A_j(t)$ is an accumulated value of the antenna separation values of the pilot signals within each time slot, and a calculation formula of $A_j(t)$ is as follows:

$$A_j(t) = \sum_{i=1}^{N/2} A_{i,j}(t)$$

where N is the number of pilot signal symbols within each time slot, $A_{i,j}(t)$ is an antenna separation value of a pilot signal of an index i corresponding to a path of an index j within a time slot of an index t.

Specifically, the first autocorrelation values may be R(k1) and R(k2), and the second autocorrelation value is R(k3).

The determining module 32 may be specifically configured to determine a first speed range when either of R(k1) and R(k2) is a negative value and determine the smooth window length corresponding to the first speed range as a first length value; or determine a second speed range when R(k1) and R(k2) are both positive values, determine a fine range within the second speed range according to a ratio value between R(k3) and R(k1) and a preset threshold when in the second speed range, and determine the smooth window length according to the fine range, where the first length value is smaller than or equal to the smooth window length within the second speed range. Furthermore, the determining module 32 is configured to determine the smooth window length as a second length value when the ratio value between R(k3) and R(k1) is greater than a first preset threshold, determine the smooth window length as a third length value when the ratio value between R(k3) and R(k1) is between the first preset threshold and a second preset threshold, or determine the smooth window length as a fourth length value when the ratio value between R(k3) and R(k1) is smaller than the second preset threshold, where the second length value is greater than the third length value, the third length value is greater than the fourth length value, and the fourth length value is greater than or equal to the first length value. The specific length values may be k1=1, k2=2, and k3=4.

In this embodiment, symbols of the first autocorrelation values are first compared to divide a large speed range. When the speed is in an extremely high speed range, it may be directly determined that a small smooth window length is adopted. When the first autocorrelation values are both positive values, speed division may be further performed to increase the accuracy.

In this embodiment, through the two-step method, an effective range of speed estimation may be expanded, so as to ensure that higher accuracy of the speed estimation is obtained within a low speed range, which satisfies system requirements, thereby further increasing the accuracy of the channel estimation and improving the system performance.

Persons of ordinary skill in the art should understand that, all or a part of the steps of the method according to the embodiments may be implemented by a program instructing relevant hardware. The program may be stored in a computer readable storage medium. When the program is executed, the steps of the method according to the embodiments are performed. The storage medium may be any medium capable of storing program codes, such as a Read Only Memory (ROM), a Random Access Memory (RAM), a magnetic disk, or an optical disk.

Finally, it should be noted that the preceding embodiments are merely provided for describing the technical solutions of the present invention, but not intended to limit the present invention. It should be understood by persons of ordinary skill in the art that although the present invention has been described in detail with reference to the embodiments, modifications may be made to the technical solutions described in the embodiments, or equivalent replacements may be made to some technical features in the technical solutions, as long as such modifications or replacements do not depart from the spirit and scope of the present invention.

What is claimed is:

1. A method for determining a smooth window length in channel estimation the method comprising:
   obtaining autocorrelation values of pilot signals, wherein the autocorrelation values comprise at least two first autocorrelation values and at least one second autocorrelation value wherein the autocorrelation values of the pilot signals are autocorrelation values in non-zero correlation intervals;
   determining a speed range according to symbols of the first autocorrelation values or according to the symbols of the first autocorrelation values and a ratio value between the second autocorrelation value and one of the first autocorrelation values; and
   determining the smooth window length according to the speed range;
   wherein a calculation formula for obtaining the autocorrelation values of the pilot signals is as follows:

$$R(k) = \sum_{f=1}^{M} R_f(k)$$

wherein R(k) is the autocorrelation value of the pilot signal, k is a correlation interval and not equal to 0, M is the preset number of multi-path search periods, and $R_f(k)$ is an autocorrelation value of a pilot signal within a multi-path search period of an index f, and the calculation formula of $R_f(k)$ is as follows:

$$R_f(k) = \sum_{t=1}^{L_{mpsf}} \sum_{j=1}^{N_f} \{\mathrm{Re}[A_j(t-k) \times A_j^*(t)]\}$$

wherein $L_{mpsf}$ is the number of pilot channel time slots contained in the multi-path search period of the index f, $N_f$ is the number of effective paths in the multi-path search period of the index f, Re( ) is an operation for taking a real part, $A^*_j$ is a conjugate function of $A_j(t)$, $A_j(t)$ is an accumulated value of the antenna separation values of the pilot signals within each time slot, and a calculation formula of $A_j(t)$ is as follows:

$$A_j(t) = \sum_{i=1}^{N/2} A_{i,j}(t)$$

wherein N is the number of pilot signal symbols within each time slot, $A_{i,j}(t)$ is an antenna separation value of a pilot signal of an index i corresponding to a path of an index j within a time slot of an index t.

2. The method according to claim 1, wherein the first autocorrelation values are R(k1) and R(k2), and the second autocorrelation value is R(k3), wherein |k1|<|k2|<|k3|.

3. The method according to claim 2, wherein the determining the speed range according to the symbols of the first autocorrelation values or the symbols of the first autocorrelation values and the ratio value between the second autocorrelation value and one of the first autocorrelation values and the determining the smooth window length according to the speed range comprise:

when either of R(k1) and R(k2) is a negative value, determining a first speed range, and determining the smooth window length corresponding to the first speed range as a first length value; and when R(k1) and R(k2) are both positive values, determining a second speed range, determining a fine range within the second speed range according to a ratio value between R(k3) and R(k1) and a preset threshold when in the second speed range, and determining the smooth window length according to the fine range, wherein the first length value is smaller than or equal to the smooth window length within the second speed range.

4. The method according to claim 3, wherein the determining the fine range within the second speed range according to the ratio value between R(k3) and R(k1) and the preset threshold and determining the smooth window length according to the fine range comprise:

determining the smooth window length as a second length value when the ratio value between R(k3) and R(k1) is greater than a first preset threshold;

determining the smooth window length as a third length value when the ratio value between R(k3) and R(k1) is between the first preset threshold and a second preset threshold;

determining the smooth window length as a fourth length value when the ratio value between R(k3) and R(k1) is smaller than the second preset threshold, wherein the second length value is greater than the third length value, the third length value is greater than the fourth length value, and the fourth length value is greater than or equal to the first length value.

5. The method according to claim 4, wherein the ratio value between R(k3) and R(k1) is an α-filtered ratio value.

6. The method according to claim 2, wherein k1=1, k2=2, and k3=4.

7. A device for determining a smooth window length in channel estimation, comprising:

an obtaining module, configured to obtain autocorrelation values of pilot signals, wherein the autocorrelation values comprise at least two first autocorrelation values and at least one second autocorrelation value; and a determining module, configured to:

determine a speed range according to symbols of the first autocorrelation values or according to the symbols of the first autocorrelation values and a ratio value between the second autocorrelation value and one of the first autocorrelation values, and determine the smooth window length according to the speed range;

wherein the autocorrelation values of the pilot signals are autocorrelation values in non-zero correlation intervals, and the autocorrelation value of the pilot signals is as follows:

$$R(k) = \sum_{f=1}^{M} R_f(k)$$

wherein R(k) is the autocorrelation value of the pilot signal, k is a correlation interval and not equal to 0, M is the preset number of multi-path search periods, and $R_f(k)$ is an autocorrelation value of a pilot signal within a multi-path search period of an index f, and the calculation formula of $R_f(k)$ is as follows:

$$R_f(k) = \sum_{t=1}^{L_{mpsf}} \sum_{j=1}^{N_f} \{Re[A_j(t-k) \times A_j^*(t)]\}$$

wherein $L_{mpsf}$ is the number of pilot channel time slots contained in the multi-path search period of the index f, $N_f$ is the number of effective paths in the multi-path search period of the index f, Re( ) is an operation for taking a real part, $A^*_j(t)$ is a conjugate function of $A_j(t)$, $A_j(t)$ is an accumulated value of the antenna separation values of the pilot signals within each time slot, and a calculation formula of $A_j(t)$ is as follows:

$$A_j(t) = \sum_{i=1}^{N/2} A_{i,j}(t)$$

wherein N is the number of pilot signal symbols within each time slot, $A_{i,j}(t)$ is an antenna separation value of a pilot signal of an index i corresponding to a path of an index j within a time slot of an index t.

8. The device according to claim 7, wherein the first autocorrelation values are R(k1) and R(k2), and the second autocorrelation value is R(k3), and the determining module is further configured to determine a first speed range and determine the smooth window length corresponding to the first speed range as a first length value when either of R(k1) and R(k2) is a negative value; or determine a second speed range when R(k1) and R(k2) are both positive values, determine a fine range within the second speed range according to a ratio value between R(k3) and R(k1) and a preset threshold when in the second speed range, and determine the smooth window length according to the fine range, wherein the first length value is smaller than or equal to the smooth window length within the second speed range, and |k1|<|k2|<|k3|.

9. The device according to claim 8, wherein the determining module is further configured to determine the smooth window length as a second length value when the ratio value between R(k3) and R(k1) is greater than a first preset threshold, determine the smooth window length as a third length value when the ratio value between R(k3) and R(k1) is between the first preset threshold and a second preset threshold, or determine the smooth window length as a fourth length value when the ratio value between R(k3) and R(k1) is smaller than the second preset threshold, wherein the second length value is greater than the third length value, the third length value is greater than the fourth length value, and the fourth length value is greater than or equal to the first length value.

10. The method according to claim 8, wherein k1=1, k2=2, and k3=4.

* * * * *